United States Patent [19]
Droge et al.

[11] Patent Number: 5,291,028
[45] Date of Patent: Mar. 1, 1994

[54] OPTICAL DEVICE FOR SENSING MARKS ON A SURFACE USING GREEN LIGHT IMPINGING AT LEAST SIXTY-FIVE DEGREES TO THE NORMAL

[75] Inventors: David A. Droge, Charlotte, N.C.; Ralf Fischer, Sindelfingen; Marcus Spieth, Herrenberg, both of Fed. Rep. of Germany

[73] Assignee: International Business Machines Corporation, Armonk, N.Y.

[21] Appl. No.: 918,341

[22] Filed: Jul. 21, 1992

[30] Foreign Application Priority Data

Jul. 25, 1991 [EP] European Pat. Off. ........ 91112467.5

[51] Int. Cl.$^5$ .............................................. G06K 7/10
[52] U.S. Cl. .................................... 250/568; 235/472
[58] Field of Search ............... 250/566, 216, 556, 557, 250/568, 237 R, 227.13, 226; 358/473; 340/707; 235/472, 465, 468, 469

[56] References Cited

U.S. PATENT DOCUMENTS

| | | | |
|---|---|---|---|
| 3,509,353 | 4/1970 | Sundblad et al. | 250/227.13 |
| 4,471,384 | 9/1984 | Sato et al. | 235/469 |
| 4,675,531 | 6/1987 | Clark et al. | 235/472 |
| 4,804,949 | 2/1989 | Faulkerson | 235/472 |
| 5,142,135 | 8/1992 | Farchmin | 250/566 |

*Primary Examiner*—David C. Nelms
*Assistant Examiner*—K. Shami
*Attorney, Agent, or Firm*—Bernard Tiegerman

[57] ABSTRACT

An optical device for sensing marks carried on an area to be sensed of a medium, especially printed and/or handwritten patterns, is disclosed. Sensing of marks is accomplished by inclined illumination of the area to be sensed by a light source (3) emitting shortwave light, especially in the green spectral area, and reception of reflected light by a photoreceptor (4).

15 Claims, 6 Drawing Sheets

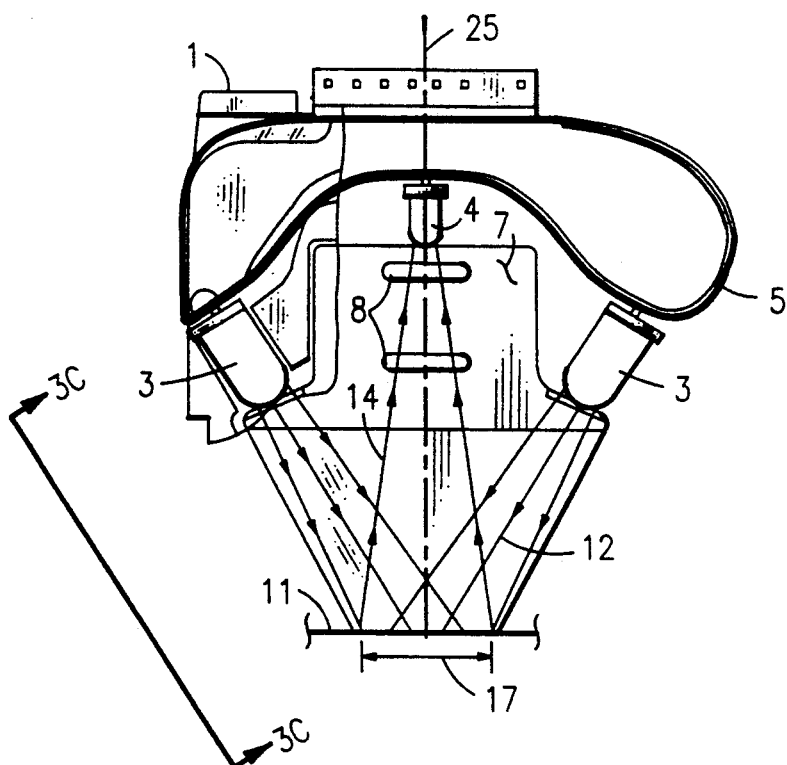
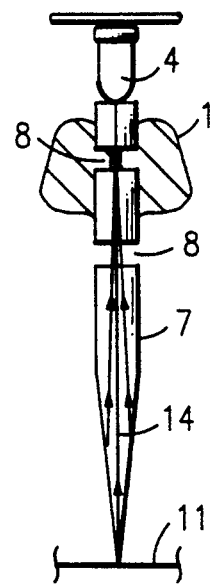
FIG.3A  FIG3B
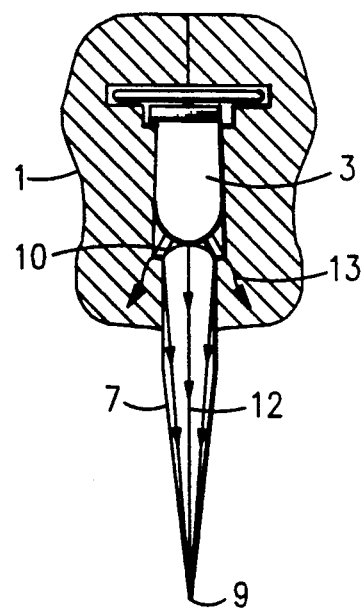
FIG.3C

OPTICAL DEVICE FOR SENSING MARKS ON A SURFACE USING GREEN LIGHT IMPINGING AT LEAST SIXTY-FIVE DEGREES TO THE NORMAL

BACKGROUND OF THE INVENTION

Field of the Invention

The present invention relates to an optical device for sensing marks carried on an area to be sensed of a medium, especially printed and/or handwritten patterns.

In particular, the present invention relates to an optical line detecting apparatus for detecting lines printed with commonly available dot-matrix or other impact printers, or lines written by hand on bank passbooks, normal pages or similar media. When combined with the proper decoding electronics and software, this invention can also be used to recognize optical line patterns such as bar codes identifying bank passbook page numbers or other similar application.

Description of the Related Art

Automation of common bank customer activities in recent years combined with automation of printing processes and other related functions has led to the requirement of being able to identify the existence and location of printed or handwritten lines on the media in use. These lines can be printed with new or used ribbons, different colors of inks, light or heavy pressure and on various densities and types of media resulting in wide variations in the accuracy of line detection by sensors using conventional sensor technology.

To date, most sensors detect the smaller amount of light reflected from the darkened area of a printed line and compare this to the larger amount of light reflected from the non-printed white portion of the media. This comparison is generally called print contrast. A major factor contributing to the accuracy of the sensor is the ability of the physical design to minimize the negative effects that arise and maximize the print contrast signal.

From EP-A-0 298 517 an optical pattern detecting apparatus for detecting a bar code or other such patterns is known. The optical pattern detecting apparatus comprises a light emitting device, a photoreceptor (photodetector) for sensing reflected light and a common lens which condenses light irradiated from the light emitting device onto a surface having a pattern and further guides light reflected from the surface to the photoreceptor. Since a light stop is provided in the beam path only a small spot-like region on the patterns detecting surface is illuminated.

However, the general design for pen-type sensors disclosed in the referenced European patent application is not useful for normal dot-matrix line detection. These sensors require the scanning region to be dimensionally small and printed with special characters to insure accuracy due to the small circular resolution of the effective sensing area. These characters must contain significantly dark regions within scanned area of restricted width to produce a print contrast signal when compared to the scanned white regions (e.g. bar codes satisfy this requirement). This limitation is not desirable nor feasible in some applications due to customer printing requirements. Normal lines printed by other print technology can be missed by this type of sensor due to space between letters and words.

Another sensor type uses an aperture with a defined length and small width through which the emitted light, reflected light or both can pass. Since the scanning area is longer than for hand-held devices, this technology can detect lines with spaces between individual dots and words but is subject to other problems as explained below.

From IBM Technical Disclosure Bulletin, Vol. 8, No. 11, April 1966, page 1574, a mark sense read head is known having two illumination sources located at the sides of a tape carrying characters. Due to the orientation of the illuminating sources relative to the tape surface, reflected rays are diffused and spectral reflection is avoided. Thus no significant change in the diffused light results when creases or folds pass under the read head.

FIG. 6 shows a similar conventional line detection sensor using aperture technology where a card 26 provides mounting for light sensing devices such as phototransistors (i.e. PTX) 4. A housing 25 provides mounting for card 26, light emitting devices such as LED's 3 and an aperture 27 used to restrict the viewing angle of the PTX 4. Housing 25 thus maintains proper configuration for the elements above.

As shown in the end view of FIG. 6, light rays 12 irradiate from the LED's 3 thereby illuminating the printed media surface 11. The PTX's 4 view the printed surface only in the width and length allowed by the aperture 27 as shown in the plan view of FIG. 6. The PTX's 4 detect the differences in print contrast as explained above and send the analog signal to the processing electronics for decoding.

Problems occur with the conventional design in normal printing use. The image previously printed with a new ribbon on the backside of the media will often appear as a sufficiently dark area on the scanned side of the media to cause a false line detection. This error occurs not only in the aperture technology under discussion but also in the hand-held scanning devices and other designs based on fiber optic bundles. Past technology often requires customers to change printer ribbons before their normal printing life time to insure dark printing. In this manner, signal processing thresholds can be set at a higher level than the signal from printing on the backside of the media.

In the conventional aperture design, lines printed closely together are detected as one line because the resolution of the system is limited to approximately the printed line width. This also is a detriment to the ability of the sensor to distinguish simple bar code patterns effectively because of close spacing.

The conventional technology is subject to problems related to the light source as well. LED's frequently have uneven lighting patterns causing erroneous print contrast signals from the PTX. Low PTX signals become a problem if the wavelength of the light source is below the red spectrum due to the inability of common PTX technology to respond efficiently in the short wavelength spectrum such as green colors. Light sources with long wavelength red or infrared cannot read many of the handwritten entries that are required in some customer applications. While optical fiber technology can overcome some of these problems, the cost of the assembly rises and the time to manufacture, assemble and adjust the sensor increases.

Furthermore, small aperture designs are often subject to dust and environmental contamination which leads to high maintenance costs and customer interruption.

SUMMARY OF THE INVENTION

The present invention addresses the problems mentioned above, in particular the problem of providing an optical device for reliably sensing marks.

The invention as claimed solves these problems in advantageous manner.

In accordance with the present invention, the optical device for sensing marks carried on an area to be sensed of a medium, especially printed and/or handwritten patterns, comprises:

a light source for illumination of the area to be sensed under an angle of incidence, the light source emitting shortwave light, especially in the green spectral area, the angle of incidence being chosen below 35 degrees in relation to the plane to be sensed, preferably on average about 25 degrees and a photoreceptor for receiving light reflected from the area to be sensed.

Light being reflected on the backside of the medium is strongly absorbed by the medium, because of the relatively long light path within the medium and the use of shortwave light, since absorption of shortwave light is stronger than of longwave—e.g. red—light. Thus light reflected on the backside of the medium does not significantly contribute to the light impinging on the photoreceptor.

In a preferred embodiment of the invention a width of the area to be sensed is smaller—preferably substantially smaller—than a minimum width extending in a scanning direction of the marks to be sensed.

Printing ink tends to diffuse into the printing media, the concentration of the printing ink decreasing from the printing surface to the backside of the media. Consequently, diffused ink inside the media does not conserve the printing patterns shape and size. The printing patterns shape at a level inside the media is somehow blurred and the patterns size is increased by the diffusion. Obviously, blurring of shape and increase in size increase the deeper the ink penetrates into the media.

However, concentration of ink on the printing surface—and thus absorption of light—is strongest on the printing surface. Thus it is desirable to restrict the area to be sensed at a time to a small region, preferably to a region substantially smaller than the smallest printing pattern, in order to increase the dynamic of the output signal of the photoreceptor.

Consequently, the extension of the area to be sensed seen in scanning direction is smaller—preferably substantially smaller—than a minimum extension in scanning direction of the marks. The shape of the area to be sensed can be rectangular, e.g., for sensing bar code, or circular for a dot-by-dot detection.

In another group of preferred embodiments only diffused light reflected substantially normally from the area to be sensed impinges on the photoreceptor. This is to prevent diffused light being reflected inside the media under an arbitrary angle to impinge on the photoreceptor. Since light being not reflected normally to the surface virtually widens the area to be sensed, it decreases the dynamic of the output signal of the photoreceptor due to the above described diffusion of the ink.

In another group of preferred embodiments of the invention, light rays irradiated from the light emitting devices are focused by convex lenses formed on the light guide and then transmitted through the light guide device. Rays converge to a very thin line at the light guide tip where they are then allowed to irradiate from the light guide onto the scanned surface. Rays are refracted at the interface of the light guide device and the media to a relatively flat angle of incidence. A sufficient amount of light is distributed along a defined width while maintaining a small width resolution at the scanned surface of the media. This light pattern is achieved without adjustments irregardless of the typical large tolerances associated with most commonly available light emitting devices. This broad operational capability eliminates the need for special reflectors to focus light and adjustable apertures to allow only certain light beams to pass. The increased light energy focused at the scanned surface allows the use of commonly stocked LED components even if low-energy green light is chosen.

The flat angle of incidence for light irradiated onto the scanned media and the use of short wavelength green light aids in the ability of the sensor to read lines of light print on the media surface without reading lines of dark print on the backside of the media. This ability reduces detection errors and improves ribbon life for the customer. The use of visible green light enables the sensor to detect many handwritten entries which infrared sensors cannot. The fine width resolution over a specified length of this sensor give opportunity to read simple bar code patterns when combined with a suitable signal processing concept in addition to the ability to read printed lines with spaces between letters and words. In previous aperture technology, this function was difficult to achieve with reliability due to poor resolution resulting in signals without sharp edges and precise peaks.

A series of fixed light stop apertures integral to the light guide optic allow the photoreceptor to use light rays in a plane normal to scanned media which increases sensor efficiency over small paper movements. Apertures also prevent stray internal light reflections inside the light guide from reaching the photoreceptor which could cause a reduction in the print contrast value reducing the sensor effectiveness. This approach has an advantage over prior art in that critical aperture adjustments, high tolerances, and contamination problems are eliminated, in addition to simplifying the assembly.

The light guide focuses the emitted light and receives the reflected light directly at the emitting tip and therefore, allows the scanned surface to be in contact with the light guide tip. The need for a small, exact space to be held between the emitting portion and the scanned media for focusing purposes is now eliminated. Contamination of this small space by paper dust and ink is no longer a problem since the light guide is self-cleaning being in contact with the scanned media. In addition, the guard sheath used in other designs such as the previously discussed hand-scanner is not needed thereby reducing part count and added cost.

Another preferred embodiment allows the installation of a cylindrical lens between the light guide device and the scanned media so light reflected from media at an angle to the sensor can be even more efficiently collected. This further improves the operability of the sensor over disruptions in the scanned media such as the center fold in some passbooks and yet, maintains the ability of the media to remain in contact with the cylindrical lens due to the previously mentioned function of the light guide.

Additionally to these many functional advantages is that the entire sensor can be composed of a few, simple and low cost parts which are without adjustment and easily assembled. The overall sensor assembly is not affected by dust and contaminants which further reduces maintenance cost in the field.

Furthermore, the simplistic conceptual approach of this light guide sensor allows multiple variations for use in other applications such as the hand-scanning device mentioned above where it would be incorporated as a vertical cylindrical light guide with the light stop aperture being a cylindrical cut of appropriate depth and a ball lens being formed at the tip of the light guide thus saving parts and increasing function. Single PTX and LED configurations can be imaged whereby the overall size of the sensor is quite small for use in many applications. There is also ample opportunity for use of like part numbers with symmetrical design to reduce overall tolerances, part count and ultimately, cost.

The foregoing and other aspects of the invention will become more apparent upon the following description of preferred embodiments.

BRIEF DESCRIPTION OF THE DRAWINGS

FIG. 1 through FIG. 5 show preferred embodiments in accordance with the present invention wherein:

FIG. 1 is a plan view showing essential components;

FIG. 2 contains a view (FIG. 2A), a plan view (FIG. 2B) an end view (FIG. 2C) of the sensor identifying major components and their relation with one another;

FIG. 3 is a series of partial views with FIG. 3A showing a plan view of the optical components and light paths, FIG. 3B showing an end view of the PTX light path, and FIG. 3C showing an end view of the LED light path;

FIG. 4 is a series of partial views showing alternative optical component configurations where

FIG. 5 is a series of magnified partial end views of the light guide and media where FIG. 5A–FIG. 5D demonstrate principles of operation for the light guide.

DETAILED DESCRIPTION OF THE PREFERRED EMBODIMENTS

Hereinafter, description is made of preferred embodiments in accordance with the present invention based on FIG. 1 through FIG. 5.

Figure 1:
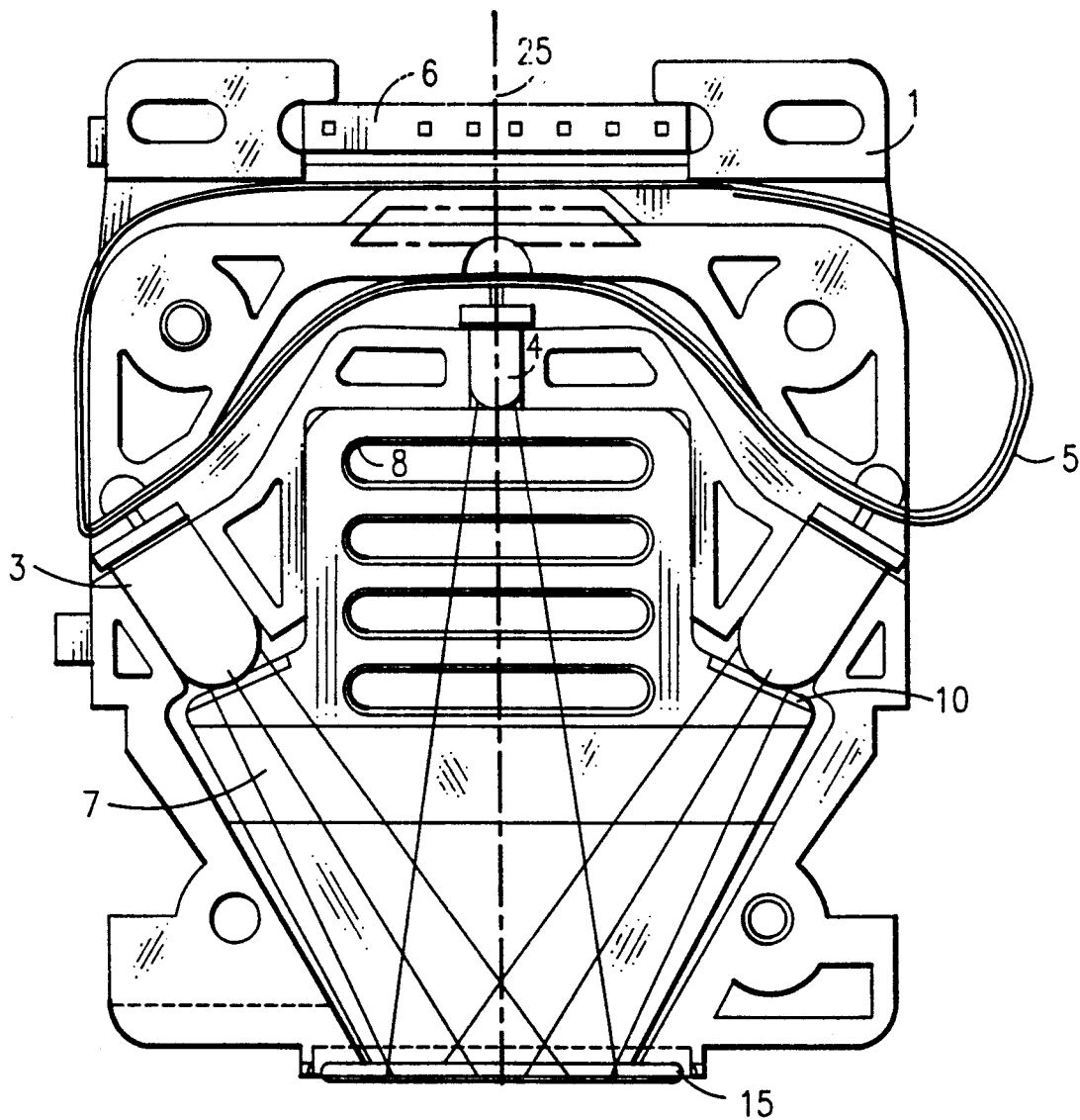

FIG. 1 shows an optical device according to the present invention. The optical device comprises a casing 1, light sources 3 for illumination of the area to be sensed and a photoreceptor 4. The light sources 3 and the photoreceptor 4 are arranged on a flexible cable band 5 carrying the connection lines and a connector 6. Further, the optical device comprises a light guide means 7 being formed as one single essentially wedge-like and triangle-like formed piece of light guiding material. The light guide means 7 of the preferred embodiment of FIG. 1 further comprises convex lenses 10, 15, the lens 15 on the exit side of the light guide means being formed by a separate rod-like cylindrical lens 15. The rod-like cylindrical lens is made of a hard quartz-glass and the light guide means is made of a light-guiding plastic material such as plexiglass. In this preferred embodiment the plastic material has a refractive index of about 1.497. Light rays having a high angle of incidence—approximately 60 to 85 degrees—relative to the area to be sensed inside the light guide 7 are refracted twice: Firstly at the interface light guide 7—lens 15 and secondly at the interface lens 15—medium. Thus the area to be sensed is illuminated under an angle of incidence below 35 degrees, on average 25 degrees, according to the light guiding materials used in this embodiment. The light guide means thereby form illuminating light paths and an imaging light path without leaving any open gaps to focus the light rays with a maximum intensity onto the medium. Apertures 8 are formed as recesses in the light guide means. The slot-like shaped recesses extending perpendicularly to a normal 25 of said area to be sensed insure that only light normally reflected the said sensed area impinges onto the photoreceptor 4.

Figure 2A:
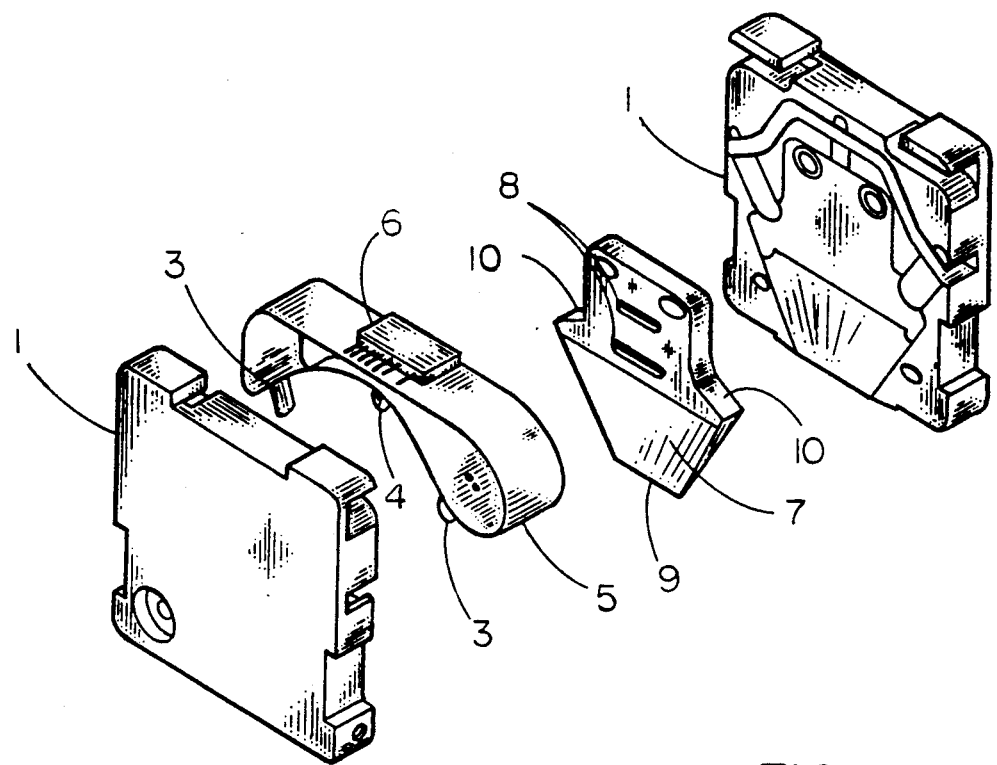
Figure 2B:
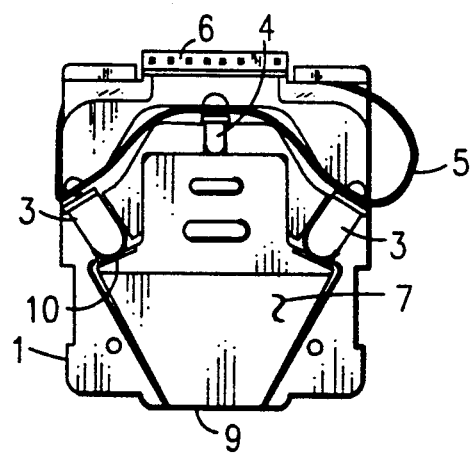
Figure 2C:
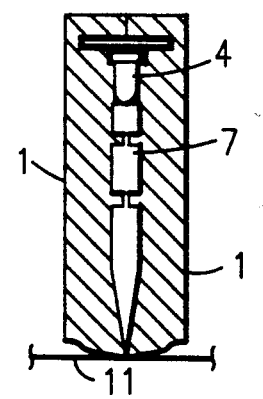

FIG. 2 shows a molded plastic casing is formed by two identical half parts 1 symmetrical around the vertical center axis. The casing half parts 1 are connected together by an engagement means such as snaps or screws which can be later disengaged. Recesses and features molded in the casing half parts 1 retain a light guide 7 with the emitting end 9 flush with the bottom of the casing which contacts the scanned media 11. Other molded recesses in casing half parts 1 retain the photoreceptor (PTX) 4 and the LED's 3 in proper relation to the light guide 7. The PTX 4 and LED's 3 are mounted to a flexible circuit 5 which maintains proper center distance and establishes electrical connection between these optoelectronic components and the connector 6. The flexible circuit 5 is held in a predetermined pattern by channels molded into the casing half parts 1. Features molded into the top of the casing half parts 1 hold the connector 6 firmly to withstand normal cable connecting forces. In addition, these features provide protection for the leads of connector 6 during product assembly operations prior to attachment of the mating cable connector.

As shown in FIGS. 3A and 3C, the LED's 3 are entrapped between the assembled casing half parts 1 such that their optical center axis is held normal to the convex lenses 10 formed in the light guide 7 with the tip of LED's 3 touching the surface of the convex lens 10. This arrangement allows most emitted light rays 12 to be collected by the convex lens 10 and focused to the emitting tip 9 of the light guide 7. In addition, the relative arrangement of the convex lenses 10 and LED's 3 is such that light rays 12 are forced to refract out of the emitting tip 9 at an angle of incidence to the media 11 of less than 35 degrees. This angle of incidence and the length of the scanned field can be changed by introducing a compound lens shape to the convex lens 10. The width 17 at the emitting tip 9 of the light guide 7 controls the width resolution of the present sensor. For example, an area to be sensed of 0.3 mm in width and 12 mm in length is easily obtainable with a tip of 0.3 mm × 12 mm dimensions.

Figure 4A:
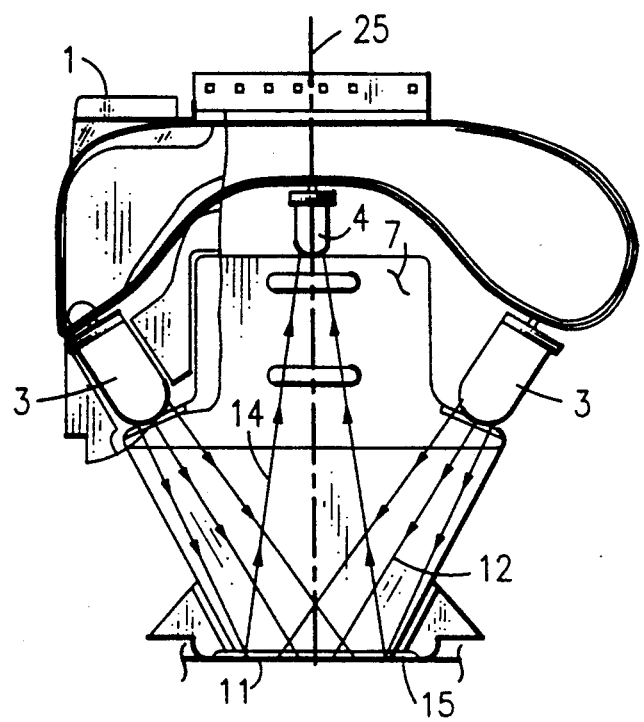
FIG. 4A is a plan view showing light paths with the addition of a cylindrical lens.
Figure 4B:
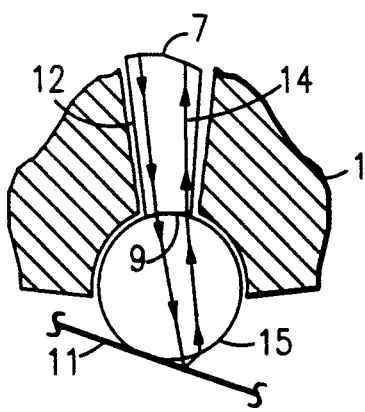
FIG. 4B is a magnified end view of the cylindrical lens configuration and FIG. 4C is a magnified end view of an alternative light guide lens configuration.
Figure 4C:
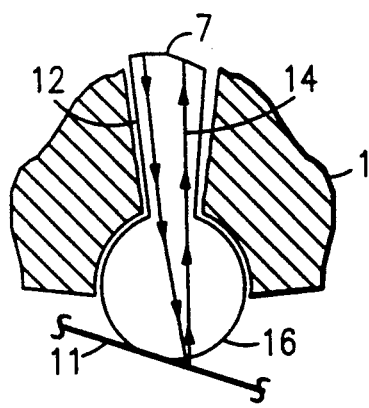

FIGS. 4A and 4B demonstrate that a cylindrical lens 15 can be placed in a molded channel at the bottom of the casing half parts 1 such that the lens 15 is trapped when casing half parts 1 are assembled. The configuration of the lens 15 is such that it touches the emitting tip 9 of the light guide 7 on one side and the scanned media 11 on the other. This configuration allows reflected light rays 14 to be collected by the lens 15 and be refracted to the emitting tip 9 should the media 11 be at an angle to the sensor assembly. In FIG. 4C, the function of the cylindrical lens 15 is also shown to be possible if the emitting tip 9 of the light guide 7 is formed into a cylindrical shape 16 of appropriate radius and shape.

Operation of the above mentioned embodiment is now described. Commonly available LED's 3 emit green light in a 360 degree radial direction around the LED 3 optical axis. In addition, light rays 12 proceed from the LED's 3 at various angles to the optical axis. In the preferred embodiment, LED's 3 are green with 200-300 millicandles of light energy and have a maximum light intensity at 10 degrees off the optical axis center. FIG. 3C shows that light rays not collected by the convex lens 10 are absorbed by casing 1 which is of a black, non-glare moldable substance. Convex lens 10 possesses a radius that refracts light rays 12 into an angle such that they collectively gather at the emitting tip 9 of the light guide 7 without striking the side walls.

Figure 5A:
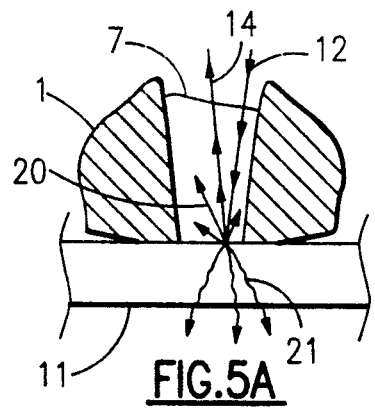

Light rays 12 refract from emitting tip 9 onto the scanned media surface 11 at an incidence angle of 60-85 degrees from vertical along the length of the light guide 7. The scanned media 11 disperses emitted rays 12, reflecting some rays 20 and rays 14 into pattern as seen in FIG. 5A and absorbing other rays 21. As seen in FIGS. 3B and 5A, a portion of the reflected rays 14 are transmitted at an angle such that when they refract out of the light guide top surface, the PTX 4 senses their existence and produces an analog signal in a known proportion to the amount of rays 14. Rays 20 which are not at a correct angle are caught by apertures 8 and absorbed by casing half parts 1.

Figure 5B:
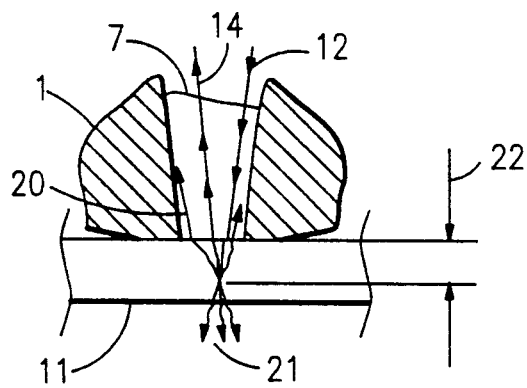
Figure 5C:
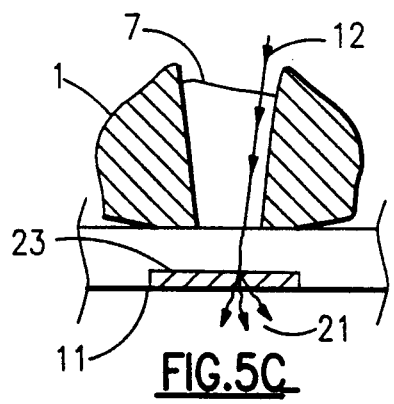

Media reflection theories also suggest that some emitted rays 12 penetrate partially into the media 11 and then disperse into reflected rays 20 and absorbed rays 21 at some depth 22 into the media as depicted in FIG. 5B. Experiments with the preferred embodiments demonstrate that shorter red wavelengths will penetrate most media further than longer green wavelengths, thereby increasing the opportunity for rays 14 to reflect back into the emitting tip 9 from within the media 11. FIG. 5C demonstrates that if a sufficient amount of rays 14 are normally reflected to the PTX 4 in white areas and then, are absorbed by printing 23 on the backside of the media 11, the output signal of the PTX 4 will drop indicating the presence of a line. This problem is solved in the preferred embodiment by using high-incidence angle green light which appears to not penetrate the scanned media 11 to the extent of direct red or infrared light, thus reducing the chances of emitted rays 12 ever reaching the printing 23 on the backside of media 11.

Figure 5D:
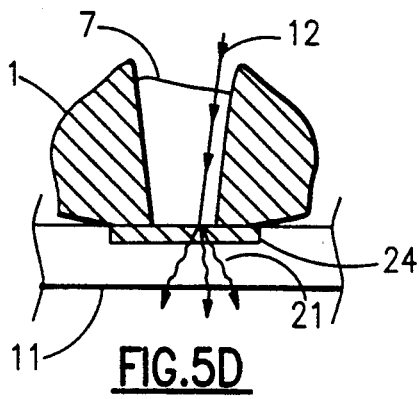
Figure 6A:
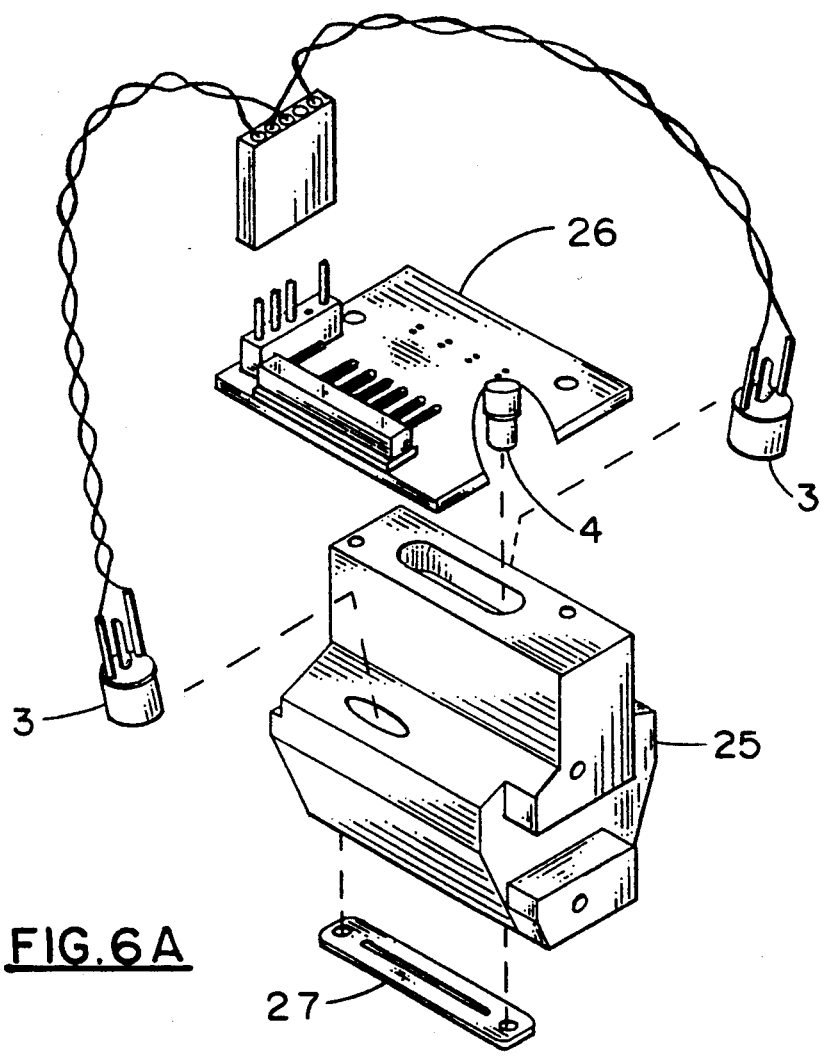
FIGS. 6A, 6B, and 6C are plan, end and perspective views of a conventional device using aperture technology.
Figure 6B:
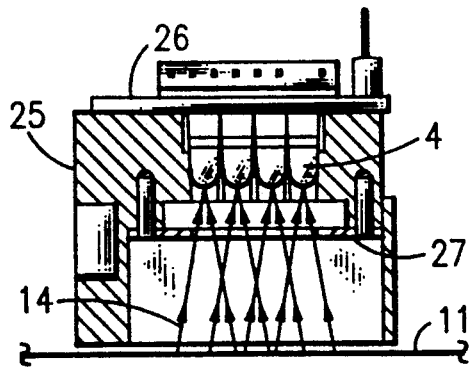
Figure 6C:
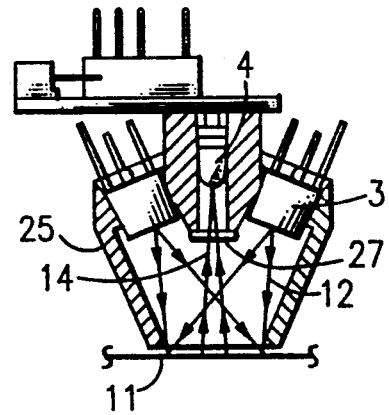

FIGS. 5A and 5D demonstrate that normal lines 24 printed on the scanned surface of the media 11 are detected when the reflected light rays 14 from a white surface are absorbed by the darker printing 24 rather than being reflected. Less rays 14 reach the PTX 4 causing a drop in the output signal which denotes that a line or printed pattern such as a bar code is currently under the scanning width of the light guide emitting tip 9. The amplitude of the PTX 4 output signal will be in proportion to the amount and density of dark area compared to the amount of white area under the length and width of the emitting tip 9 at any given moment. Since the width resolution of the emitting tip 9 in the preferred embodiment is very small, PTX 4 output signals will be a precise and accurate depiction of any change between this dark vs. white area on the surface of media 11.

FIGS. 1 to 5 show an optical device having light sources located at both sides of the normal of the medium 11. One light source, however, is sufficient to accomplish the objects of the invention. Further the light sources could be realized as laser diodes making the light guide means 7 obsolete.

We claim:

1. An optical device for detecting marks on an area of a medium, comprising:
    at least a first light source which is capable of emitting green light;
    a photoreceptor which is capable of receiving green light reflected from said area; and
    light guide means, positioned so as to be capable of optical communication with said at least first light source, said area and said photoreceptor, for guiding at least a portion of the green light emitted by said at least first light source to said area at an angle of incidence, relative to the plane of said area, less than 35 degrees and for guiding at least a portion of the green light reflected by said area to said photoreceptor.

2. The optical device of claim 1, wherein said light guide means includes means for insuring that only diffused light reflected substantially normally from said area impinges upon said photoreceptor.

3. The optical device of claim 1, wherein said first light source includes a light emitting diode.

4. A method for detecting marks on an area of a medium, comprising the steps of:
    impinging green light on said area at an angle of incidence, relative to the plane of said area, less than 35 degrees; and
    receiving green light substantially normally reflected from said area with a photoreceptor.

5. The optical device of claim 1, wherein said light guide means defines at least a first light path through said light guide means for light impinging upon said light guide means, said light guide means including a first convex lens at an entry side of said first light path and a second convex lens at an exit side of said first light path, said first and second convex lenses serving to focus light into said light guide means and onto said area at said angle of incidence, respectively.

6. The optical device of claim 1, wherein said light guide means includes at least one aperture which insures that only light substantially normally reflected from said area impinges upon said photoreceptor.

7. The optical device of claim 6, wherein said aperture is formed as a recess in said light guide means, and extends perpendicularly to a normal to said area.

8. The optical device of claim 1, wherein said light guide means is formed as a single essentially wedge-like and triangle-like piece of light guiding material.

9. The optical device of claim 5, wherein said second convex lens is a rod-like cylindrical lens.

10. The optical device of claim 9, wherein said rod-like cylindrical lens is made of a hard quartz-glass.

11. The optical device of claim 1, wherein said light guide means is made of a light-guiding plastic material.

12. The optical device of claim 1, wherein, in operation, said light guide means is in mechanical contact with said medium.

13. The optical device of claim 1, further comprising a second light source which is capable of emitting green light, said first and second light sources being arranged on opposite sides of a normal to said area.

14. The optical device of claim 1, wherein said at least first light source and said photoreceptor are arranged on a flexible cable band carrying connection lines and a connector, said band is arranged in slots of two halves of a housing, said housing further including said light guide means in appropriate shaped recesses.

15. An optical device for detecting marks on an area of a medium, comprising:

means for impinging green light on said area at an angle of incidence, relative to the plane of said area, less than 35 degrees; and a photoreceptor which is capable of receiving green light reflected from said area.

* * * * *